(12) United States Patent
Bern

(10) Patent No.: US 8,572,092 B2
(45) Date of Patent: Oct. 29, 2013

(54) GENERATING SKETCHES SENSITIVE TO HIGH-OVERLAP ESTIMATION

(75) Inventor: Marshall W. Bern, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/328,901

(22) Filed: Dec. 16, 2011

(65) Prior Publication Data

US 2013/0159352 A1     Jun. 20, 2013

(51) Int. Cl.
*G06F 7/00* (2006.01)

(52) U.S. Cl.
USPC ........................................................ 707/747

(58) Field of Classification Search
USPC ........................................................ 707/747
See application file for complete search history.

(56) References Cited

U.S. PATENT DOCUMENTS

| | | | |
|---|---|---|---|
| 5,511,190 A * | 4/1996 | Sharma et al. ........................ | 1/1 |
| 6,169,990 B1 * | 1/2001 | McGregor et al. .................... | 1/1 |
| 2002/0083033 A1 * | 6/2002 | Abdo et al. ......................... | 707/1 |
| 2002/0091715 A1 * | 7/2002 | Coady ............................ | 707/200 |
| 2003/0005306 A1 | 1/2003 | Hunt et al. | |
| 2005/0132342 A1 * | 6/2005 | Van Lunteren ............... | 717/143 |
| 2006/0190465 A1 * | 8/2006 | Nakano ......................... | 707/100 |
| 2007/0005556 A1 * | 1/2007 | Ganti et al. ........................ | 707/1 |
| 2008/0222212 A1 | 9/2008 | Prasad et al. | |
| 2009/0254572 A1 * | 10/2009 | Redlich et al. .................. | 707/10 |

OTHER PUBLICATIONS

Li, Ping et al., "b-Bit Minwise Hashing", 2010, Entire document.
Forman, George et al., "Efficient Detection of Large-Scale Redundancy in Enterprise File Systems", 2009, Entire document.
Broder, Andrei Z. et al., "Min-Wise Independent Permutations", Journal of Computer and System Sciences, 2000, pp. 630-659.
Broder, Andrei "On the resemblance and containment of documents", In the Compression and Complexity of Sequences, Positano, Italy, 1997.
Li, Ping et al., "Theory and Applications of b-Bit Minwise Hashing", Communications of the ACM, vol. 54 no. 8, Aug. 8, 2011, Section 1.
Suel, T. et al., "Improved file synchronization techniques for maintaining large replicated collections over slow networks", Proceedings 20th International Conference on Data Engineering, 2004, IEEE, pp. 153-164.

\* cited by examiner

*Primary Examiner* — Robert Beausoliel, Jr.
*Assistant Examiner* — Nirav K Khakhar
(74) *Attorney, Agent, or Firm* — Shun Yao; Park, Vaughan, Fleming & Dowler LLP

(57) ABSTRACT

A versioning system determines an amount by which a first collection and a second collection of data objects overlap. The system divides the first collection of data objects into m possibly overlapping groups of average size s and computes one combined hash result for each group. The system then constructs a first sketch vector with n elements based on the combined hash results. A respective element of the first sketch vector is selected, using a selection function, from the combined hash results that are computed with the hash function corresponding to the element's index. Next, the system receives a second sketch vector for the second collection of data objects, and determines a sketch-vector overlap between the first and second sketch vectors. The system then computes a data-object overlap between the first and second collections of data objects based on the sketch-vector overlap.

15 Claims, 5 Drawing Sheets

GENERATING SKETCHES SENSITIVE TO HIGH-OVERLAP ESTIMATION

BACKGROUND

1. Field

This disclosure is generally related to data synchronization. More specifically, this disclosure is related to generating a vector of hash function values (a "sketch") representing a collection of data.

2. Related Art

In many computing applications, it is often important for two remote document collections to synchronize their data. Moreover, if document collections from two remote computer systems are meant to be identical, then their data is likely to agree at the 99% level. However, to determine such high-overlap estimations with a reasonable level of accuracy (e.g., ±0.5%), the information exchanged between the two computer systems will need to be based on a substantially large sample of the data.

A commonly used measure of the agreement between two collections A and B of data objects (files) is the "overlap." This overlap can be computed as the number of objects in the intersection of A and B divided by the number of objects in the union ($|A \cap B|/|A \cup B|$), which will be a real number between 0 and 1. Individual data objects can be represented by checksums, for example 128-bit hash function values, such that if two checksums agree, it is highly likely that the two data objects agree. To estimate the overlap between a local data collection A and a remote data collection B, a computer system may receive some or all of the checksums for the data objects in the remote collection B, and compare these checksum values to those for local collection A. Unfortunately, the overlap estimate may be highly inaccurate unless all the checksums are transferred.

Moreover, communicating the checksum values for the remote data collection can involve a high-bandwidth file transfer operation that makes it infeasible to frequently compare the contents of the local and remote file collections. If the computer system desires to estimate the overlap frequently, the remote system may need to reduce the amount of transferred information by generating checksum values for a small subset of files, at the cost of significantly reducing the quality of the overlap estimation.

Some overlap-estimation systems reduce the amount of communication by using min-wise hashing to generate a sketch vector. In this technique, there is a set of n universally known hash functions, $h_1, h_2, \ldots, h_n$, and a collection A of data objects is represented by a vector of n numbers, ($min_1, min_2, \ldots, min_n$), where $min_i$ is the minimum value of $h_i$ over all data objects in A. The vector of minimum values is called a "sketch," and the overlap of collections A and B can be estimated by the overlap of their sketches.

In many applications, accurate overlap estimation is especially important for collections that have a high overlap (e.g., 90%-100%). However, the precision of the estimate depends upon the size of the sketch. For example, if n is less than 100, the sketch may not reliably distinguish 97% from 98% overlap, and if n is less than 1000, the sketch may not reliably distinguish 97.7% from 97.8% overlap. Therefore, these overlap-estimation systems may require an undesirably large sketch vector to compute a detailed overlap estimate for two collections that are expected to be nearly identical.

SUMMARY

One embodiment provides a system that determines an amount by which a first collection and a second collection of data objects overlap. The system divides the first collection of data objects into m possibly overlapping groups of average or uniform size s and computes one combined hash result for each group. The system then uses the combined hash results as if they are hashes of the original data objects. That is, the system constructs a first sketch vector with n elements based on the combined hash results. A respective element of the first sketch vector is selected, using a selection function (e.g., that selects the minimum-valued combined hash result), from the combined hash results that are computed with the hash function corresponding to the element's index. Next, the system receives a second sketch vector for the second collection of data objects, and determines a sketch-vector overlap between the first and second sketch vectors. The system then computes a data-object overlap between the first and second collections of data objects based on the sketch-vector overlap.

In some embodiments, the system computes the data-object overlap by entering the sketch-vector overlap into a conversion function:

$$\text{data-object overlap} = (\text{sketch-vector overlap})^{1/s}$$

The variable s indicates an average number of data objects per group.

In some embodiments, the system divides the first collection of data objects by using a hash function to map each member of the first collection of data objects into one of the m groups.

In some embodiments, the system computes a combined hash result for a group by computing a hash result for each of the data objects corresponding to the group, and computing a combined hash result for the group based on the hash results.

In some embodiments, the first sketch vector and the second sketch vector have a matching length.

In some embodiments, the system determines the sketch-vector overlap by determining a fraction of corresponding vector elements between the first and second sketch vectors that have matching values.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of determining an estimated amount by which two distributed data repositories overlap, such that the accuracy for the overlap estimation is optimized for when the two data repositories are near identical. For example, a computer system may determine the overlap estimation between a local data repository and a backup data repository on a remote computer system by receiving a sketch vector that represents the backup data repository, and then comparing the remote sketch vector to a local sketch vector for the local data repository.

The sketch vector includes a set of hash results generated by grouping objects in the data repository into m possibly overlapping groups of average size s, and then computing combined hash results on each of the m groups. Note that the length of the sketch vector depends upon the number of agreed-upon hash functions, but not upon the number of groups nor the size of the data repository. Thus, two computer systems may exchange sketch vectors representing their complete data repositories without exchanging large amounts of data.

Further, when the local and remote repositories are near identical, two corresponding sketch vector entries from the local and remote sketch vectors are likely to be computed based on matching groups (e.g., groups comprising matching data objects). Therefore, these two corresponding sketch vector entries are likely to have matching values when the data objects in the group are identical at the local and remote repositories, and are likely to have different values when at least one data object in the group is different or missing at the local or remote repository. Thus, because the system generates the sketch vector by grouping data objects, the system can transfer a sketch vector to a remote device that consumes a low communication overhead while still facilitating determining a highly accurate overlap estimation when the local and remote data repositories are near identical.

Figure 1:
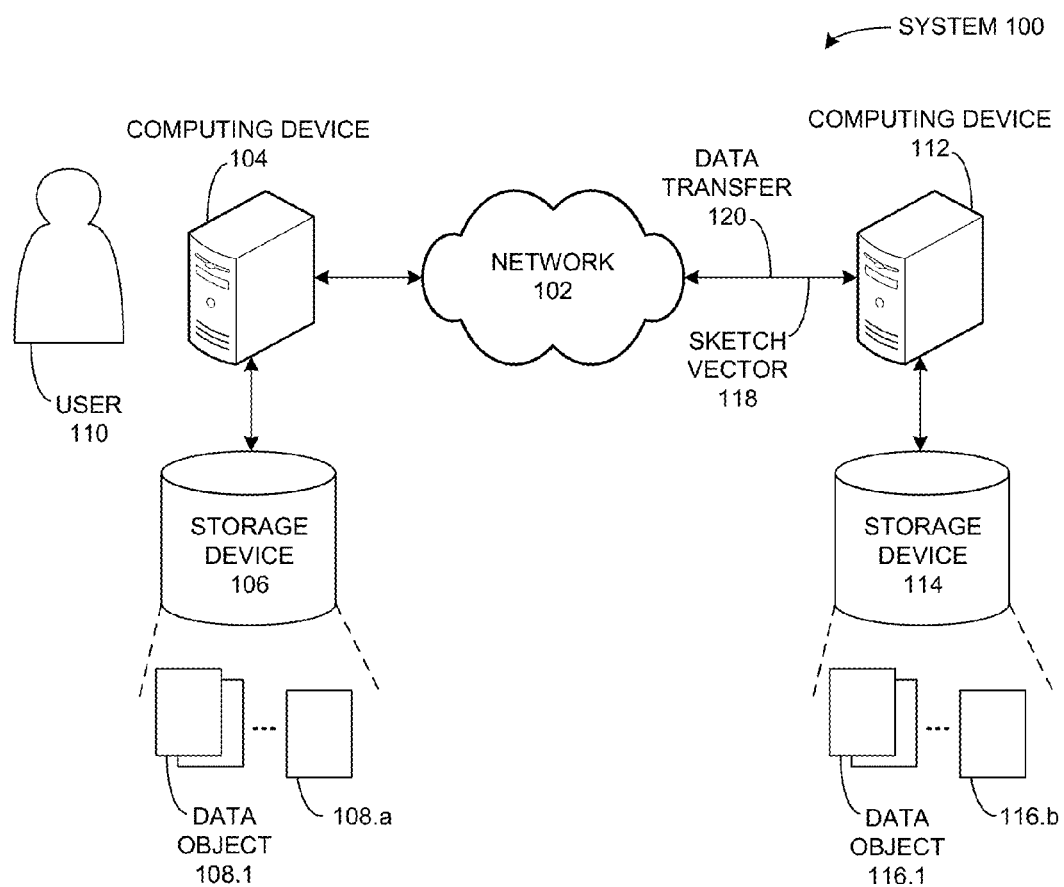
FIG. 1 illustrates an exemplary distributed computing system in accordance with an embodiment.

FIG. 1 illustrates an exemplary distributed computing system 100 in accordance with an embodiment. Computing system 100 can include a computing device 104 coupled to a storage device 106, and a computing device 112 coupled to a storage device 114. Each of storage devices 106 and 114 can store various types of data objects such as a file, a fixed-size block, a database object, a data archive, and/or other data objects at any data granularity.

In some embodiments, computing device 104 can use storage device 106 to store at least a subset of data objects from storage device 114 of computing device 112. For example, computing device 104 can include a portable computing device (e.g., a smartphone, a tablet computer, or a laptop), a desktop computer, or a server computer, and can use storage device 106 to store data objects 108.1-108.a pertaining to a user 110. Also, computing device 112 can include a desktop computer or server computer that uses storage device 114 to store a backup copy of data objects 108.1-108.a for user 110.

User 110 can configure computing device 104 to periodically synchronize the data in storage device 106 with the data at computing device 112. Thus, computing device 104 can periodically request a sketch vector 118 from computing device 112 to determine whether the collection of data objects has changed at storage device 106 and/or at storage device 114. For example, user 110 may create, modify, or delete a data object on storage device 106. As another example, computing device 112 may create, modify, or delete a data object at storage device 114 in response to a previous synchronization operation with a different computing device (e.g., another client device attributed to user 110). Thus, when computing device 104 receives sketch vector 118 from computing device 112 via network 102, computing device 104 can compare sketch vector 118 to a sketch vector for data objects 108.1-108.a to determine whether the files are synchronized between computing devices 104 and 112.

Overlap Estimation and Coverage Estimation

Figure 2:
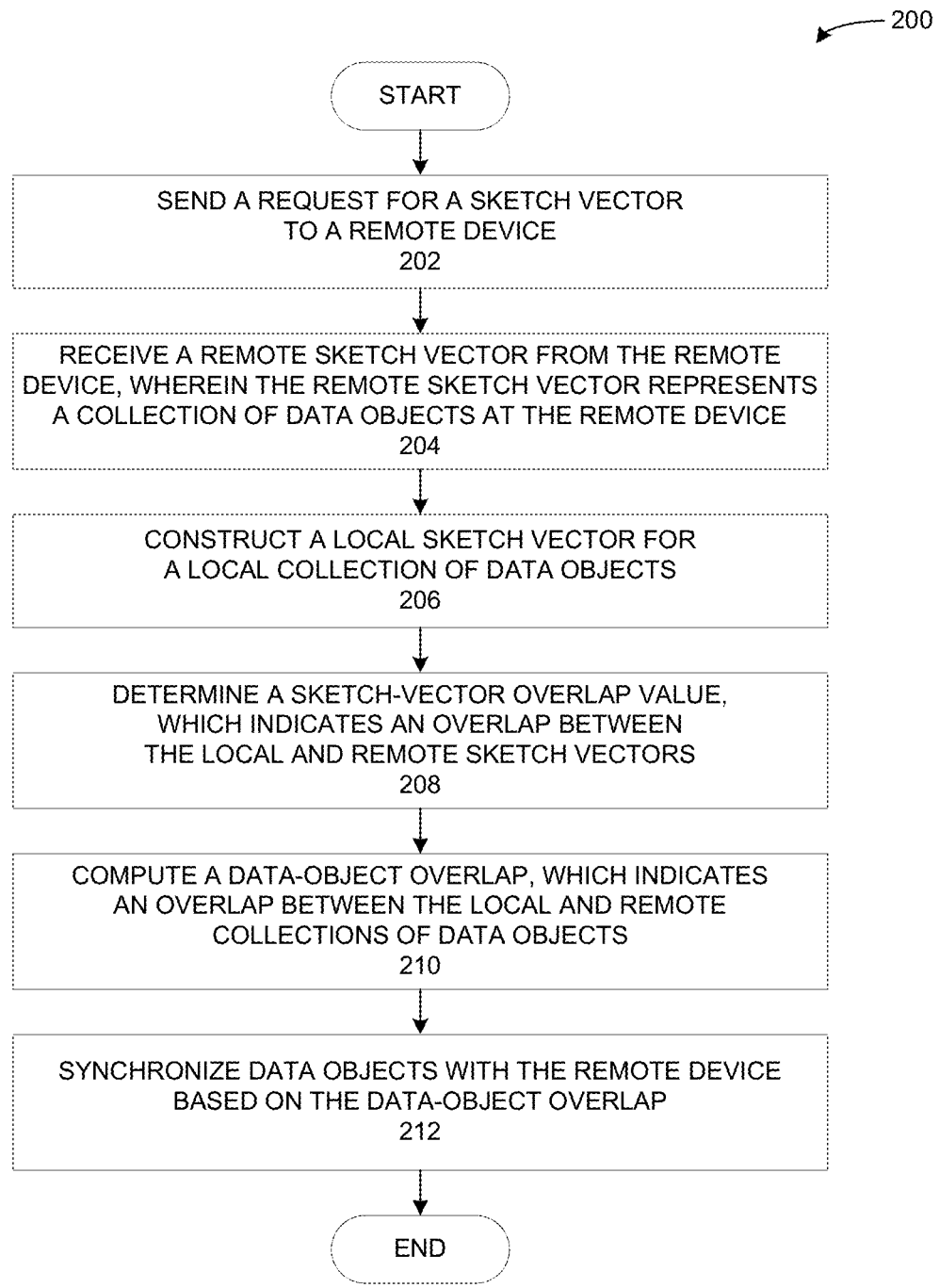
FIG. 2 presents a flow chart illustrating a process for estimating an overlap between a local and a remote data repository in accordance with an embodiment.

FIG. 2 presents a flow chart illustrating a process for estimating the overlap between a local and a remote data repository in accordance with an embodiment. During operation, the local device can send a request for a sketch vector to a remote device (operation 202). Then, the local device receives a remote sketch vector from the remote device (operation 204), and generates a local sketch vector for a local collection of data objects (operation 206). In some embodiments, the local device generates the local sketch vector in a similar way to the remote device. For example, the local device can use the same grouping function and the same pair-wise independent hash functions as the remote device. These functions may either be predetermined (e.g., selected from a configuration file or determined based on a certain standard or protocol), or may be negotiated by the local and remote devices.

In some embodiments, the request from the local device can indicate the grouping function and the pair-wise independent hash functions that should be used to generate the sketch vector. In some other embodiments, the request can indicate a size for the requested sketch vector (e.g., a number of sketch vector entries), and the remote device may generate the collection of pair-wise independent hash functions based on the size of the sketch vector. The request can also indicate a subset of files at the remote device that should be used to generate the sketch vector. For example, the request can indicate one or more directories of a file system at the remote device. As another example, the request can indicate one or more tables of a database at the remote device, or may indicate a database query that should be used to select a collection of data objects from which to generate the sketch vector.

Once the local device receives the remote sketch vector, the local device determines a sketch-vector overlap that indicates an overlap between the local and remote sketch vector (operation 208). For example, computing devices 104 and 112 (see FIG. 2) can each store a data repository, which are hereby denoted as data repositories "A" and "B ," respectively. Further, computing devices 104 and 112 can each generate a sketch vector for their corresponding data repository, which are hereby denoted as sketch vectors "A" and "B ," respectively. Sketch vector $S_A$ can correspond to data objects 108.1-108.a at computing device 104, and sketch vector $S_B$ can correspond to data objects 116.1-116.b at computing device 112. In some embodiments, the sketch vectors $S_A$ and $S_B$ are constructed to have matching lengths. Also, the sketch-vector overlap is computed as the fraction of corresponding vector elements between the first and second sketch vectors that have matching values. Thus, the sketch-vector overlap can be computed using the expression $|S_A \cap S_B|/|S_A \cup S_B|$.

Then, the local device may compute a data-object overlap that indicates an overlap amount between the local and remote collections of data objects (operation 210). In some embodiments, the system computes the data-object overlap by entering the sketch-vector overlap into a conversion function:

$$\text{data-object overlap} = (\text{sketch-vector overlap})^{1/s}.$$

The variable s indicates the average number of data objects in each of the m groups. The number of groups m may be similar to the number of original data objects or may be smaller. The average size, s, of a group depends upon the degree of data-object overlap expected. For example, with s=10, a sketch-vector overlap of 0.90 corresponds to a data-object overlap of about 0.99, and a sketch-vector overlap of 0.95 corresponds to data-object overlap of about 0.995. Thus, s=10 gives high sensitivity to data-object overlap between 0.99 and 1.0. If data-object overlap is expected to run between 0.999 and 1.0, a larger value of s, say s=100, may be warranted. Increased sensitivity to high data-object overlap comes at the cost of less precise estimates of low overlap, so that a system using s=10 may be insensitive to the difference between a 0.3 and a 0.4 overlap. If an expected overlap is unknown or varies widely, the system can compute and store sketches for various values of s, for example s=1, 10, 100, . . . , in order to provide sensitivity over a wide range of overlap values.

In some embodiments, computing devices 104 and 112 can also use sketch vectors $S_A$ and $S_B$ to compute coverage estimations during operations 208 and 210. For example, let $v_i(A)$ and $v_i(B)$ denote the sketch vector elements at position i for sketch vectors $S_A$ and $S_B$, respectively. Then, the likelihood that $v_i(A)<v_i(B)$ is $|A\backslash B|/(|A\backslash B|+|B\backslash A|)$, where the operator "\" denotes the set difference. Thus, a computing device can compute the coverage estimation of data repository B over data repository A (e.g., a fraction of data objects in data repository A that also exist in data repository B) by computing a sketch-vector coverage as the fraction of sketch vector elements in $S_A$ and $S_B$ where $v_i(A)<v_i(B)$. Further, the computing device can compute the coverage estimation of data repository A over data repository B by computing the sketch-vector coverage as the fraction of sketch vector elements in $S_A$ and $S_B$ where $v_i(B)<v_i(A)$. Then, the computing device can compute the desired data-object coverage based on the sketch-vector coverage using the conversion function:

$$\text{data-object coverage}=(\text{sketch-vector coverage})^{1/s}.$$

The local device can then synchronize data objects with the remote device based on the data-object overlap or data-object coverage (operation 212). For example, computing devices 104 and 112 can use the data-object overlap to determine how to synchronize the data objects between computing devices 104 and 112 (e.g., which computing device is to transmit new content to the other, which protocol to use to discover new content at a computing device, etc.). If the overlap estimation is low (e.g., less than 0.75), the computing device with the smaller amount of content may send the complete data repository to the other computing device (e.g., via a data transfer 120 over network 102). However, if the overlap estimation is high (e.g., at least 0.75), computing devices 104 and 112 may each perform a binary search to determine new data objects that are to be communicated to the other computing device.

In various exemplary applications, it is often more important for the estimation to be accurate for high-overlap data sets than it is for low-overlapping data sets. For example, if data repositories A and B are meant to be identical, then the overlap estimation $|A\cap B|/|A\cup B|$ is likely to remain above 0.99 for sufficiently large A and B. Also, if the data repository A is meant to be a subset of the data repository B, then the coverage estimation $|A\cup B|/|A|$ is likely to remain above 0.99.

Figure 3:
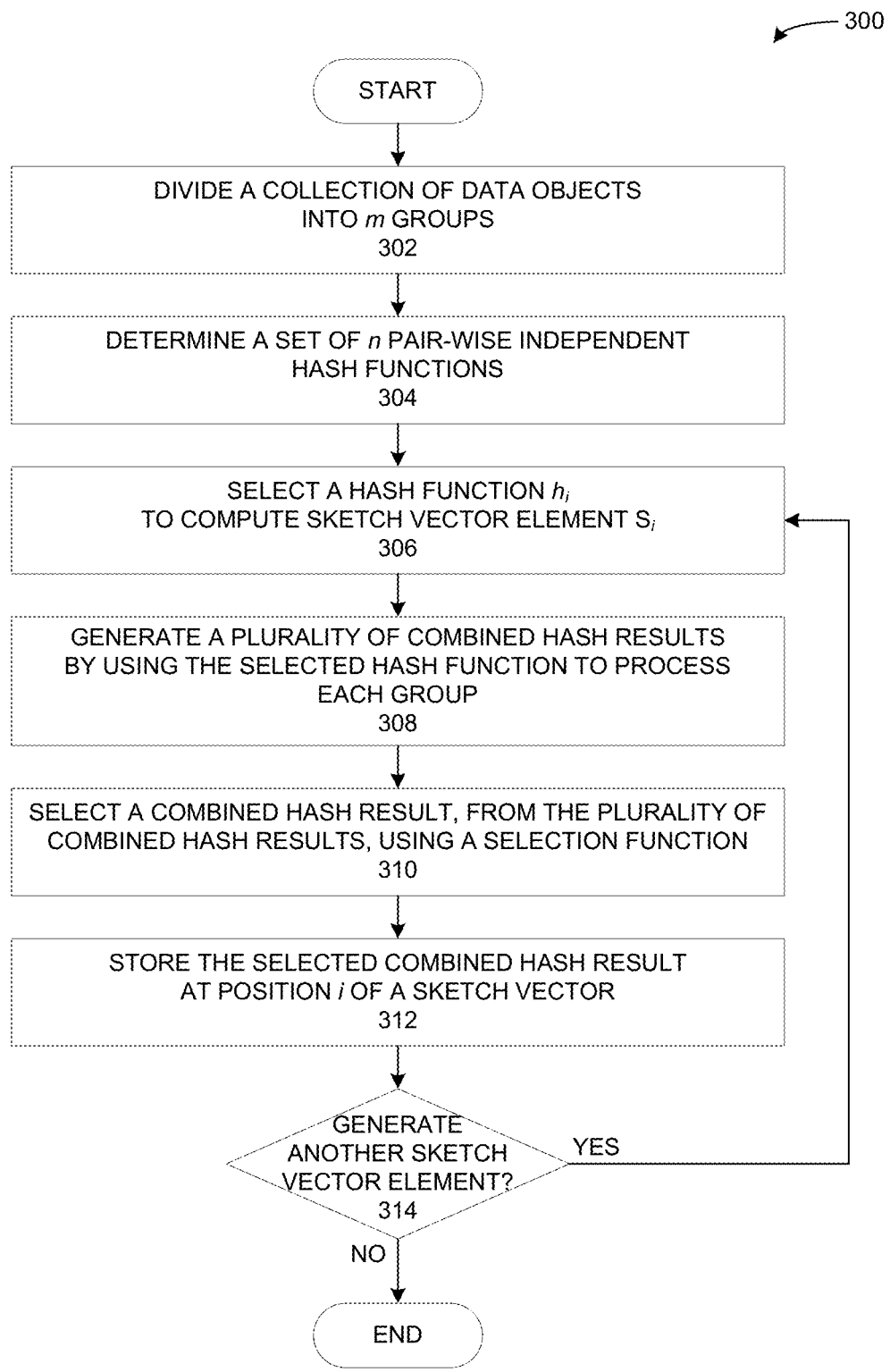
FIG. 3 presents a flow chart illustrating a process for generating a sketch vector in accordance with an embodiment.

FIG. 3 presents a flow chart illustrating a process for generating a sketch vector in accordance with an embodiment. During operation, the device can divide a collection of data objects into m possibly overlapping groups (operation 302). In some embodiments, the device can create the object groups by using a grouping function g that maps the elements of the data repository A into integers between 1 and m. For example, a grouping function $g_{10}$ can create m object groups that each have exactly 10 data objects, or have 10 data objects on average. Thus, an object group $A_j$ is a subset of data repository A, such that $A_j=\{a \in A | g(a)=j\}$. In some embodiments, groups are determined by predetermined hash functions, so that all data objects with the same hash results under some predetermined hash function form a group. The group number for a file or object may be based on an attribute for the file or object (e.g., a name, creation time or date, etc.) or based on the content of the file or object.

Then, the device may determine a collection of n pair-wise independent hash functions (operation 304). The device uses each hash function $h_i$ to generate combined hash results for a corresponding sketch vector element $v_i$, thus the collection of n hash functions should be pair-wise independent so that no two hash functions in the collection generate the same result when provided the same inputs. In some embodiments, the pair-wise independent hash functions can also be min-wise independent, meaning that for a collection of input objects, any input object of the collection is equally likely to produce the minimum when entered into the collection of min-wise independent hash functions.

The device then computes a sketch vector element by selecting a corresponding hash function from the collection of pair-wise independent hash functions (operation 306), and generates a plurality of combined hash results by using the selected hash functions to process each object group (operation 308). For example, if the device creates m object groups at operation 302, then the device will generate a corresponding set of m combined hash results at operation 308 by using each object group as input to the hash function that the device selected at operation 306.

In some embodiments, the device generates a combined hash result for a group by adding the individual hash results for the group elements. Thus, for a sketch vector element i, the device generates a combined hash for group $A_j$ such that: $h_i(A_j)=\Sigma\{h_i(a)|g(a)=j\}$. In other embodiments, the device generates the combined hash result for the group by computing the exclusive-or of the individual hash results for the group elements. Thus, for the sketch vector element i, the device generates the combined hash for group $A_j$ such that: $h_i(A_j)=\text{XOR}(\{h_i(a)|g(a)=j\})$.

Then, the device selects a combined hash result for the sketch vector element using a selection function (e.g., a minimum-valued selection function) (operation 310), and stores the selected combined hash result at a corresponding position of the sketch vector (operation 312). The device then determines if it needs to generate another sketch vector element (operation 314), and, if so, the device returns to operation 306. Thus, by performing process 300, the device constructs the sketch vector $S_A$ for data repository A, such that: $S_A=(v_1, v_2, \ldots, v_n)$, where $v_i=\min\{h_i(A_j)|1\leq j\leq m\}$.

In some embodiments, the device may determine the grouping function (for operation 302) and/or the pair-wise independent hash functions (for operation 306) based on a configuration file or a certain standard or protocol that is common to the devices of the distributed computer system. For example, the grouping function may be a predefined function that takes a desired number of groups as a first input and takes an object file as a second input, and generates a group number as an output. Similarly, the pair-wise independent hash functions may be implemented using a hash function that takes a sketch vector entry number and an object group (e.g., an ordered collection of data objects in the group) as input, and generates a combined hash result for the object group.

Figure 4:
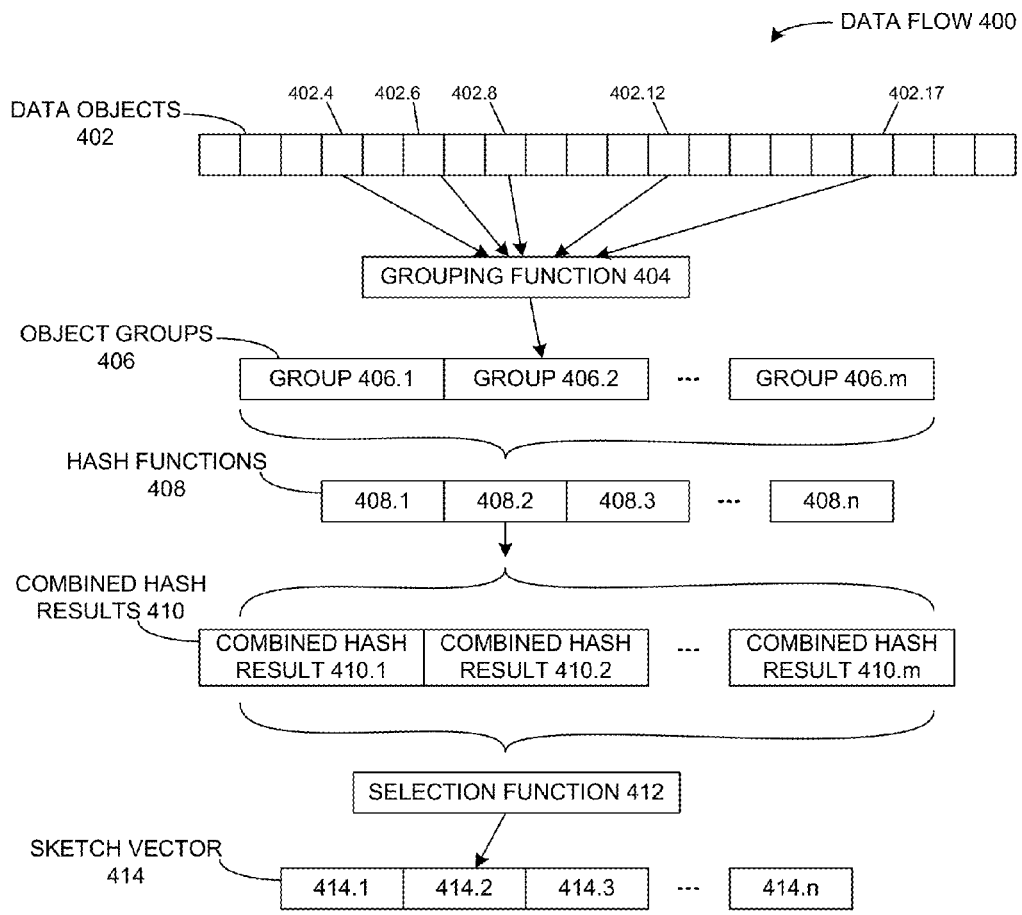
FIG. 4 presents a data flow graph for generating a sketch vector element in accordance with an embodiment.

FIG. 4 presents a data flow graph for generating a combined hash for a sketch vector element 414.2 in accordance with an embodiment. During operation 302, a computing device can use a grouping function 404 to generate object groups 406 from a collection of data objects 402. As an example, grouping function 404 may map data objects 402.4, 402.6, 402.8, 402.12, and 402.17 into group 406.2.

The device can then generate sketch vector element 414.2 by first using a corresponding hash function (e.g., using hash function 408.2) to generate combined hash results 410 for object groups 406 (e.g., during operation 308). Then, the device selects, from combined hash results 410, a value to store in sketch vector element 414.2 based on a selection function 412 (e.g., during operation 310). In some embodiments, selection function 412 may select one of combined hash results 410 based on a function that selects a minimum value. In other embodiments, selection function 412 may select one of combined hash results 410 based on any other selection function, such as a maximum-value or a median-value selection function. Further, selection function 412 can choose a combined hash result whose value is closest to a determinable number.

Figure 5:
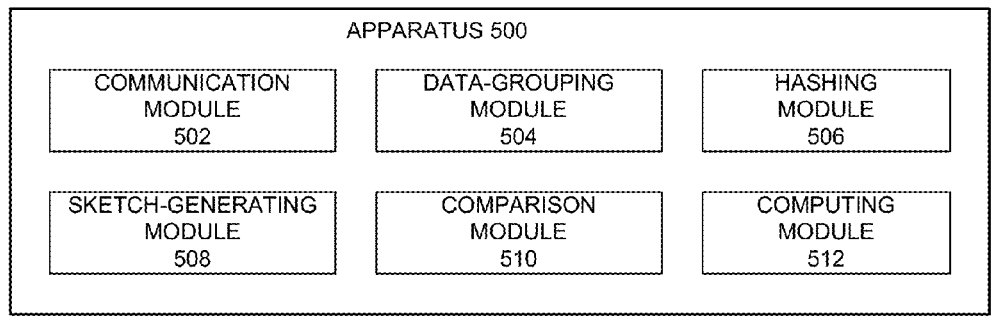
FIG. 5 illustrates an exemplary apparatus that facilitates optimizing a memory allocation for a memory pool in accordance with an embodiment of the present invention.

FIG. 5 illustrates an exemplary apparatus 500 that facilitates optimizing a memory allocation for a memory pool in accordance with an embodiment of the present invention. Apparatus 500 can comprise a plurality of modules which may communicate with one another via a wired or wireless communication channel. Apparatus 500 may be realized using one or more integrated circuits, and may include fewer or more modules than those shown in FIG. 5. Further, apparatus 500 may be integrated in a computer system, or realized as a separate device which is capable of communicating with other computer systems and/or devices. Specifically, apparatus 500 can comprise a communication module 502, a data-grouping module 504, a hashing module 506, a sketch-generating module 508, a comparison module 510, and a computing module 512.

In some embodiments, communication module 502 can send a local sketch vector to a remote device and/or receive a remote sketch vector that represents a remote collection of data objects at the remote device. Data-grouping module 504 can divide a local collection of data objects into groups, and hashing module 506 can compute a combined hash result for all members of a respective group. Sketch-generating module 508 can generate the local sketch vector based on the combined hash results. Comparison module 510 can determine a sketch-vector overlap between the local and remote sketch vectors, and computing module 512 can compute a data-object overlap between the first and second collections of data objects based on the sketch-vector overlap.

Figure 6:
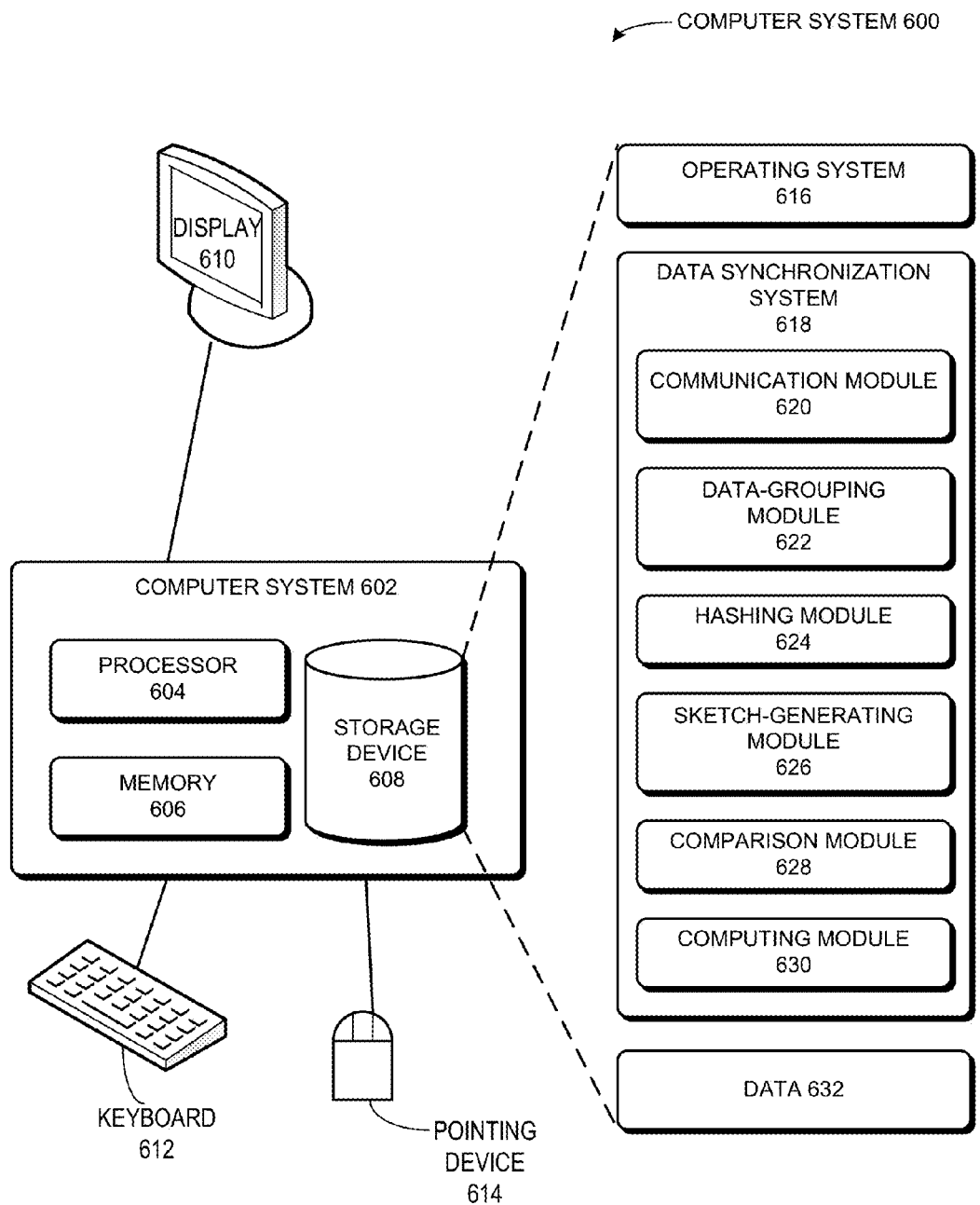
FIG. 6 illustrates an exemplary computer system that facilitates optimizing a memory allocation for a memory pool in accordance with an embodiment of the present invention.

FIG. 6 illustrates an exemplary computer system 602 that facilitates optimizing a memory allocation for a memory pool in accordance with an embodiment of the present invention. Computer system 602 includes a processor 604, a memory 606, and a storage device 608. Furthermore, computer system 602 can be coupled to a display device 610, a keyboard 612, and a pointing device 614. Storage device 608 can store operating system 616, data synchronization system 618, and data 632.

Data synchronization system 618 can include instructions, which when executed by computer system 602, can cause computer system 602 to perform methods and/or processes described in this disclosure. Specifically, data synchronization system 618 can include instructions for sending a local sketch vector to a remote device and/or receiving a remote sketch vector that represents a remote collection of data objects at the remote device (communication module 620).

Further, data synchronization system 618 can include instructions for dividing a local collection of data objects into groups (data-grouping module 622), and instructions for computing a combined hash result for all members of a respective group (hashing module 624). Data synchronization system 618 can also include instructions for generating the local sketch vector based on the combined hash results (sketch-generating module 626). Data synchronization system 618 can include instructions for determining a sketch-vector overlap between the local and remote sketch vectors (comparison module 628), and instructions for computing a data-object overlap between the first and second collections of data objects based on the sketch-vector overlap (computing module 630).

Data 632 can include any data that is required as input or that is generated as output by the methods and/or processes described in this disclosure. Specifically, data 632 can store at least a collection of data objects, a collection of pair-wise independent hash functions, a collection of combined hash results, a local sketch vector corresponding to the stored collection of data objects, and a remote sketch vector corresponding to data objects at a remote device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   dividing, by a computer, a first collection of data objects into m groups of average size s, wherein a data object of the first collection is assigned to one or more of the m groups;

computing a combined hash result for all members of a respective group, for each hash function in n hash functions;

constructing a first sketch vector with n elements, wherein a respective element is selected, using a selection function, from the combined hash results computed with the hash function corresponding to the element's index;

receiving a second sketch vector for a second collection of data objects;

determining a sketch-vector overlap between the first and second sketch vectors; and computing a data-object overlap between the first and second collections of data objects based on the sketch-vector overlap, wherein computing the data-object overlap comprises entering the sketch-vector overlap into a conversion function:

$$\text{data-object overlap} = (\text{sketch-vector overlap})^{1/s};$$

wherein s indicates an average number of data objects per group.

2. The method of claim 1, wherein dividing the first collection of data objects comprises using a hash function to map each of the first collection of data objects into one of the m groups.

3. The method of claim 1, wherein computing a combined hash result for a group involves:

computing a hash result for each of the data objects corresponding to the group; and computing a combined hash result for the group based on the hash results.

4. The method of claim 1, wherein the first sketch vector and the second sketch vector have a matching length.

5. The method of claim 4, wherein determining the sketch-vector overlap comprises determining a fraction of corresponding vector elements between the first and second sketch vectors that have matching values.

6. A non-transitory computer-readable storage medium storing instructions that when executed by a computer cause the computer to perform a method comprising:

dividing a first collection of data objects into m groups of average size s, wherein a data object of the first collection is assigned to one or more of the m groups;

computing a combined hash result for all members of a respective group, for each hash function in n pair-wise independent hash functions;

constructing a first sketch vector with n elements, wherein a respective element is selected, using a selection function, from the combined hash results computed with the hash function corresponding to the element's index;

receiving a second sketch vector for a second collection of data objects;

determining a sketch-vector overlap between the first and second sketch vectors; and computing a data-object overlap between the first and second collections of data objects based on the sketch-vector overlap, wherein computing the data-object overlap comprises entering the sketch-vector overlap into a conversion function:

$$\text{data-object overlap} = (\text{sketch-vector overlap})^{1/s};$$

wherein s indicates an average number of data objects per group.

7. The storage medium of claim 6, wherein dividing the first collection of data objects comprises using a hash function to map each of the first collection of data objects into one of the m groups.

8. The storage medium of claim 6, wherein computing a combined hash result for a group involves:

computing a hash result for each of the data objects corresponding to the group; and computing a combined hash result for the group based on the hash results.

9. The storage medium of claim 6, wherein the first sketch vector and the second sketch vector have a matching length.

10. The storage medium of claim 9, wherein determining the sketch-vector overlap comprises determining a fraction of corresponding vector elements between the first and second sketch vectors that have matching values.

11. An apparatus comprising:

a processor;

a memory;

a data-grouping mechanism to divide a first collection of data objects into m groups of average size s, wherein a data object of the first collection is assigned to one or more of the m groups;

a hashing mechanism to compute a combined hash result for all members of a respective group, for each hash function in n pair-wise independent hash functions;

a sketch-generating mechanism to construct a first sketch vector with n elements, wherein a respective element is selected, using a selection function, from the combined hash results computed with the hash function corresponding to the element's index;

a communication mechanism to receive a second sketch vector for a second collection of data objects;

a comparison mechanism to determine a sketch-vector overlap between the first and second sketch vectors; and a computing mechanism to compute a data-object overlap between the first and second collections of data objects based on the sketch-vector overlap, wherein while computing the data-object overlap, the computing mechanism is further configured to enter the sketch-vector overlap into a conversion function:

$$\text{data-object overlap} = (\text{sketch-vector overlap})^{1/s};$$

wherein s indicates an average number of data objects per group.

12. The apparatus of claim 11, wherein while dividing the first collection of data objects, the data-grouping mechanism is further configured to use a hash function to map each of the first collection of data objects into one of the m groups.

13. The apparatus of claim 11, wherein while computing a combined hash result for a group, the hashing mechanism is further configured to:

compute a hash result for each of the data objects corresponding to the group; and compute a combined hash result for the group based on the hash results.

14. The apparatus of claim 11, wherein the first sketch vector and the second sketch vector have a matching length.

15. The apparatus of claim 14, wherein while determining the sketch-vector overlap, the comparison mechanism is further configured to determine a fraction of corresponding vector elements between the first and second sketch vectors that have matching values.

* * * * *